Patented Sept. 27, 1932

1,879,045

UNITED STATES PATENT OFFICE

HANNS BERNARD, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PAINT

No Drawing. Application filed August 27, 1928, Serial No. 302,433, and in Germany September 12, 1927.

The invention relates to improvements in coating compositions and more particularly to paints comprising a white pigment and yielding smooth coatings of high gloss.

A paint which is composed in the usual manner of a drying oil, with or without the addition of a thinner, and a white pigment, for example zinc oxide, has the tendency to dry to a dull film without gloss when the quantity of the covering pigment exceeds a certain upper limit. Besides, these paints applied to a smooth surface do not yield a smooth coating of uniform appearance but on drying show the strokes of brushing.

I have found that paint vehicles which may be incorporated with considerable amounts of a white pigment to form paints which dry to a glossy and smooth surface can be obtained by adding to the drying oil raw materials commonly used, aromatic hydroxy carboxylic acids or their derivatives. In carrying out my invention I incorporate with the drying oil such as linseed oil and its transformation products, China wood oil or the like (in which small quantities of resins such as colophony or ester resins may be dissolved) an aromatic hydroxy carboxylic acid which may be substituted in any manner, or a derivative thereof for example salicylic acid, 2-methoxy benzoic acid, 2.3-hydroxy naphthoic acid or the like. A small addition—up to 5 percent—of these compounds is sufficient to produce paint vehicles which are excellently suitable for brushing and yielding coatings of high gloss even with large quantities of covering pigments.

The amount of pigments used, which need not be white pigments, may be considerably higher than customarily in the manufacture of paints without injuring the properties of the varnish.

My invention is illustrated by the following example but not restricted thereto. The parts are by weight.

Example 1000 parts of stand oil (Iodine number 127; viscosity [at 100° C.] 15,5° [Engler]) are heated at 110 to 120° C. and mixed with 10 parts of 2.3-hydroxy naphthoic acid which is readily dissolved by slight stirring. After cooling down 500 parts of zinc oxide are ground in 330 parts of the mixture in the customary manner to form a paste and mixed with 110 parts of a thinner (for example a mixture of 1 part of turpentine and 9 parts of white spirit). By adding the usual amount of a drier, say, 2 parts of cobalt resinate dissolved in 8 parts of white spirit, a white paint is obtained drying to a smooth coating of high gloss.

I claim:

1. A drying oil paint composition containing 2.3-hydroxy naphthoic acid.
2. A composition of matter comprising a drying oil, a thinner, a drier, zinc oxide and a hydroxy carboxylic acid of the naphthalene series.
3. A composition of matter comprising a transformation product of linseed oil, a thinner, a drier, zinc oxide and 2.3-hydroxy naphthoic acid.
4. A composition of matter comprising stand oil, a thinner, a drier, zinc oxide and 2.3-hydroxy naphthoic acid.

In testimony whereof I have hereunto set my hand.

HANNS BERNARD.